United States Patent
Roche et al.

(10) Patent No.: US 12,326,932 B2
(45) Date of Patent: Jun. 10, 2025

(54) SYSTEM AND METHOD FOR THREAT MANAGEMENT IN DISTRIBUTED SYSTEMS

(71) Applicant: Dell Products L.P., Round Rock, TX (US)

(72) Inventors: Ian Roche, Glanmire (IE); Philip E. Hummel, San Jose, CA (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 349 days.

(21) Appl. No.: 18/150,904

(22) Filed: Jan. 6, 2023

(65) Prior Publication Data
US 2024/0232338 A1    Jul. 11, 2024

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ................. G06F 21/554; G06F 2221/034
See application file for complete search history.

(56) References Cited

U.S. PATENT DOCUMENTS

| | | | |
|---|---|---|---|
| 10,511,614 B1 * | 12/2019 | Aziz | H04L 63/1416 |
| 11,010,233 B1 | 5/2021 | Golden et al. | |
| 11,561,849 B1 | 1/2023 | Kairali et al. | |
| 2013/0263258 A1 * | 10/2013 | Freeman | H04L 63/1408 726/22 |
| 2020/0302058 A1 * | 9/2020 | Kenyon | G06F 21/554 |
| 2021/0110037 A1 * | 4/2021 | Hunt | G06F 21/554 |
| 2021/0216634 A1 * | 7/2021 | Kenyon | G06F 21/52 |
| 2021/0250373 A1 * | 8/2021 | Satish | G06F 16/285 |
| 2022/0058174 A1 | 2/2022 | Lemberg et al. | |
| 2022/0253524 A1 * | 8/2022 | Gadient | G06F 11/1469 |
| 2022/0291989 A1 | 9/2022 | Wang | |
| 2022/0398239 A1 | 12/2022 | Mehta et al. | |

OTHER PUBLICATIONS

Li, Meiman et al., "Pedestrian Motion Path Detection Method Based on Deep Learning and Foreground Detection." Complexity 2021 (11 Pages).

Hasan, Irtiza et al., "Pedestrian Detection: Domain Generalization, CNNs, Transformers and Beyond." arXiv preprint arXiv:2201.03176 (2022) (13 Pages).

(Continued)

*Primary Examiner* — Yonas A Bayou
(74) *Attorney, Agent, or Firm* — WOMBLE BOND DICKINSON (US) LLP

(57) ABSTRACT

Methods and systems for managing threats to data processing systems are disclosed. To manage the threats, multiple threat management models may be utilized. The threat management models may include centralized models that rely on operable connectivity to particular systems, and distributed models that do not rely on operable connectivity to the particular systems. The data processing systems may flexibly switch between use of these models to respond to changes in operably connectivity of a distributed system.

20 Claims, 6 Drawing Sheets

(56) References Cited

OTHER PUBLICATIONS

Hellinga, Bruce et al., "Route selection considering travel time variability." 6th World Congress on Intelligent Transport Systems, Toronto, Ontario. 1999 (8 Pages).
Hutchinson, Chris, "Building a Real-world Public Transport Routing Algorithm", Aug. 8, 2021, <https://traveltime.com/blog/public-transport-routing-algorithm> (13 Pages).
Huang, Wenbo et al., "Dynamic Guidance Strategy for Pedestrian Travel in Large-Scale Activity under Harsh Environment." Journal of Advanced Transportation 2022 (16 Pages).
Makris, Dimitrios et al., "Path detection in video surveillance." image and Vision Computing 20.12 (2002): 895-903 (18 Pages).

\* cited by examiner

SYSTEM AND METHOD FOR THREAT MANAGEMENT IN DISTRIBUTED SYSTEMS

FIELD

Embodiments disclosed herein relate generally to threat management. More particularly, embodiments disclosed herein relate to systems and methods to manage threats to distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
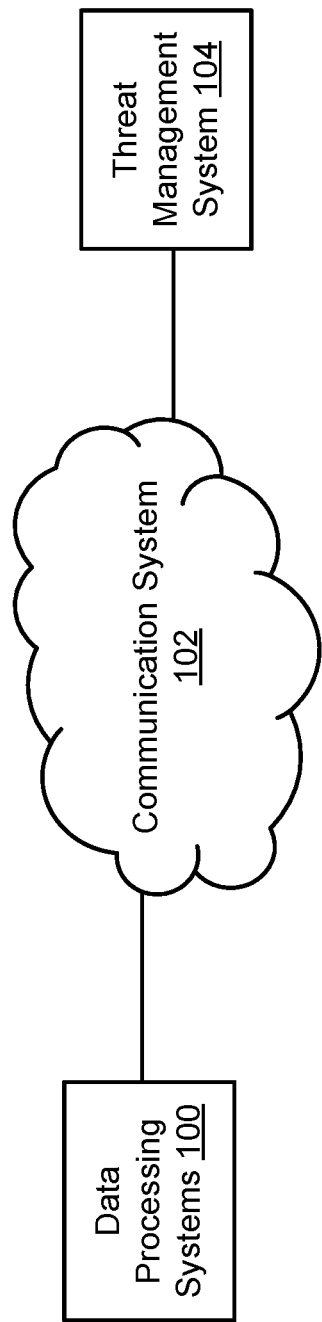
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing threats to data processing systems. The threats may be managed by identifying operations of the data processing systems indicative of the presence of threats. When identified, one or more remediation actions may be performed to reduce the susceptibility of the data processing systems to the threats.

To identify the threats, the data processing system may implement multiple threat management models. One model may be a centralized model that may require operable connectivity to a particular system, and another model may be a decentralized model that does not require operable connectivity to the particular system.

The decentralized model may utilize anomaly detection based on information collected by some data processing systems to identify operations of the data processing systems that are likely threatening to the data processing systems. Once identified, new threat signatures may be established and distributed to speed future threat identification and remediation.

By doing so, a system in accordance with embodiments disclosed herein may continue to provide for threat identification and remediation even while portions of a distributed system are not operably connected to other portions. Thus, embodiments disclosed herein may address, among other problems, the problem of intermittent connectivity in distributed systems. The intermittent connectivity may prevent centralized approaches to threat management from providing threat protection. By flexibly shifting between threat management models, data processing systems in accordance with embodiments disclosed herein may be less susceptible to threats regardless of connectivity to particular systems.

In an embodiment, a method for managing threats in a distributed environment is provided. The method may include making a determination regarding whether a first data processing system of the distributed environment is operably connected to a threat management system; in a first instance of the determination where the first data processing system is not operably connected to the threat management system: establishing an operable connection to at least a second data processing system of the distributed environment; and operating a first threat management model hosted by the data processing system using the operable connection to the at least the second data processing system, the first threat management model being independent on connectivity to the threat management system for management of the threats.

The method may also include, in a second instance of the determination where the data processing system is operably connected to the threat management system: operating a second threat management model hosted by the data processing system, the second threat management model being dependent on connectivity to the threat management system for management of the threats.

Operating the first threat management model may include monitoring an operation of the first data processing system; performing an anomaly detection process based on the operation of the first data processing system, the anomaly detection process grading the operation with respect to the first data processing system and the at least the second data processing system for anomalousness; and, in an instance of the performance of the anomaly detection process where the grade (e.g., level of anomalousness) for the operation exceeds a threshold: treating the operation as a threat.

Operating the first threat management model may also include generating a threat update (e.g., a message that includes one or more new threat profiles/profiles) based on the operation; and distributing the threat update to the at least the second data processing system.

Performing the anomaly detection process based on the operation of the first data processing system may include obtaining operation data from the at least the second data processing system; obtaining a corpus of operation data using the operation data and second operation data from the first data processing system; training an anomaly detection model using the corpus of the operation data; and using the anomaly detection model to grade the operation.

The operation data may include telemetry data for the second data processing system.

Operating the first threat management model may also include, prior to performing the anomaly detection process, classifying the operation using a plurality of threat profiles obtained from a plurality of threat updates from the at least the second data processing system, each of the threat profiles comprising criteria against which the operation may be compared to identify whether the operation is one of the threats; in a first instance of the performance of the anomaly detection process where the classification for the operation indicates that the operation is one of the threats: initiating a remediation for the one of the threats without performing the anomaly detection process; and in a second instance of the performance of the anomaly detection process where the classification for the operation indicates that the operation is not one of the threats: performing the anomaly detection process.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown), and/or may cooperate with other devices that provide the computer implemented services. Different data processing systems may provide similar and/or different computer implemented services.

For example, any of data processing systems 100 may be members of cloud environments that provide the computer implemented services. The cloud environments may include any number of devices that provide computer implemented services.

To provide the computer-implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components may need to operate in predetermined manners. If the hardware and/or software components do not operate in the predetermined manners, then a data processing systems may be unable to provide all, or a portion, of the computer-implemented services that it normally provides.

Similarly, nefarious parties may attempt to modify the operation of the hardware and/or software components to compromise the data processing system. If compromised, the nefarious parties may be able to gain access to data that may not otherwise be accessible to the parties, may attempt to restrict the computer implemented services provided with data processing systems 100, and/or may otherwise cause data processing systems 100 to operate in undesirable manners. Thus, any number of threats (e.g., cyber security threats) may be presented to data processing systems 100 over time. While described with respect to a limited number of examples throughout this applications, the threats presented to data processing system 100 may include other types of threats without departing from embodiments disclosed herein.

To reduce the likelihood of data processing systems 100 being compromised, the system of FIG. 1 may include threat management system 104. Threat management system may be part of a centralized threat management model. The centralized threat management model may obtain information from any of data processing systems 100, and analyze the information for indications of threats. Threat management systems 104 may do so using any number and types of analysis algorithms.

When threats are identified, threat management system 104 may generate and distribute threat profiles and/or other information usable by data processing systems 100 to reduce the likelihood of being compromised. Data processing systems 100 may use the threat profiles to monitor their operation and take action to reduce the likelihood of being compromised.

For example, data processing systems 100 may monitor the operation of applications, processes, etc. The threat profiles may set forth criteria with respect to the monitoring that if met indicate that the applications, processes, etc. may be due to malicious action. If malicious action is detected, data processing systems 100 may take action to screen, quarantine, terminate, and/or otherwise stop the malicious action.

In general, embodiments disclosed herein may provide methods, systems, and/or devices for managing threats to the operation of data processing systems 100. To manage the threats, data processing systems 100 may implement multiple threat management models. Data processing systems 100 may select which of the threat management models to operate depending on the operable connectivity of each data processing system to other components of the system of FIG. 1.

For example, while operably connected to threat management system 104, data processing system 100 may operate a first threat management model. The first threat management model may be the centralized threat management model as discussed above.

However, while a data processing system is not operably connected to threat management system 104, the data processing system may operate a second threat management model. The second threat management model may facilitate identification and remediation of threats while threat profiles (e.g., also referred to as "threat profiles") from threat management system 104 are unavailable.

For example, consider a scenario where a data processing system is separate from threat management system 104 due to a network outage. While separated, the threat profiles upon which the data processing system may rely may become outdated (e.g., stale). The outdated threat profiles may be unable to identify new types of series of actions or activities indicative of threats to the data processing system. Consequently, the data processing system may become compromised unless the data processing system is unable to implement other threat management models (i.e., the second threat management model).

Figure 2A:
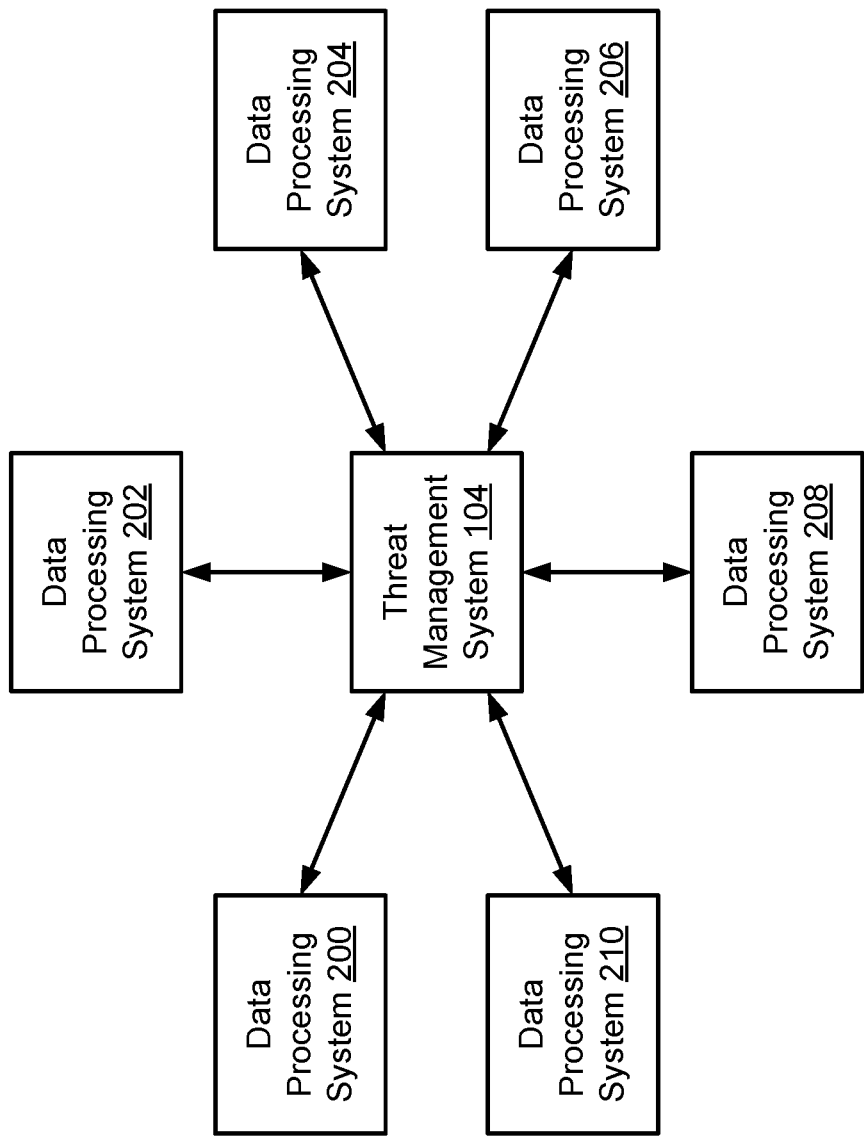
FIGS. 2A-2B show diagrams illustrating communication architectures in accordance with an embodiment.
Figure 2B:
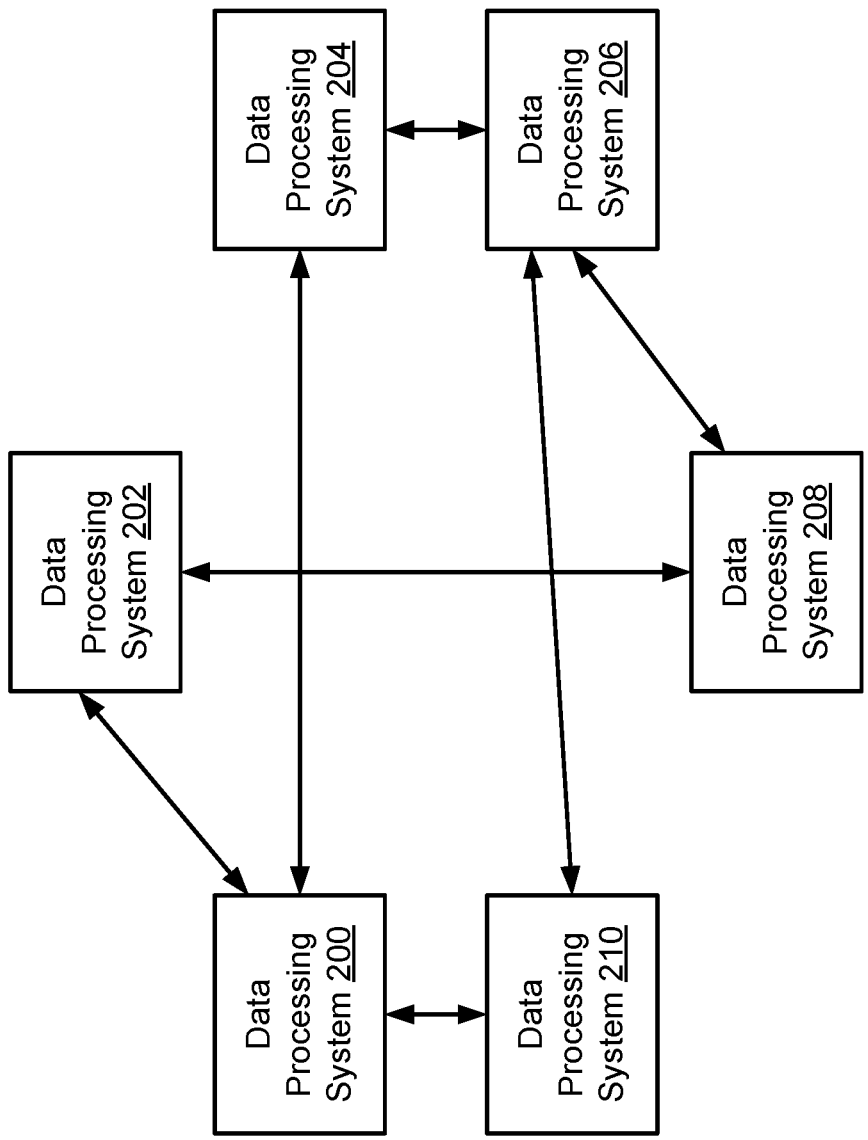

The second threat management model may be a decentralized model that uses information collected by multiple data processing systems to identify new types of threats. To implement the second threat management model, a data processing system may (i) operably connect to other data processing systems, (ii) aggregate operation data (e.g., telemetry data) from the data processing systems, (iii) obtain an anomaly detection model using the aggregated operation data, (iv) use the anomaly detection model to identify levels of anomalousness of new operations performed by the data processing system, (v) based on the anomalousness levels, identify some new operations as likely being malicious and/or otherwise indicative of malicious activity, (vi) perform remediation actions for the identified new operations, (vii) generate new threat profiles based on the identified new operations, and/or (viii) distribute the new threat profiles to the other data processing systems. By doing so, data processing systems 100 may continue to automatically detect and remediate threats while not able to communication with threat management system 104. Refer to FIGS. 2A-2B for additional details regarding implementation of the threat management models.

When providing their functionality, any of data processing system 100 and threat management system 104 may perform all, or a portion, of the method illustrated in FIG. 3.

Any of data processing systems 100 and/or threat management system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Threat management system 104 may be implemented with multiple computing devices. The computing devices of threat management system 104 may cooperatively perform processes for managing customer-encountered issues. The computing devices of threat management system 104 may perform similar and/or different functions.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

However, communication system 102 may provide intermittent connectivity between threat management system 104 and any of data processing systems 100. For example, communication system 102 may include wired and/or wireless network that may be unable to carry data for any number of reasons for various portions of time.

While illustrated in FIG. 1 as including a limited number of specific components, a system in accordance with an embodiment may include fewer, additional, and/or different components than those illustrated therein.

To further clarify embodiments disclosed herein, diagrams illustrating communication architectures are shown in FIGS. 2A-2B.

Turning to FIG. 2A, a first communication architecture in accordance with an embodiment is shown. In FIG. 2A, any of data processing systems 200-210 may be similar to data processing systems 100.

In the first communication architecture, each of data processing systems 200-210 may be operably connected to threat management system 104. The operable connections are illustrated using lines terminating in arrows.

While the system of FIG. 1 is implementing the communication architecture shown in FIG. 2A, data processing systems 200-210 may implement the first threat management model. To do so, the data processing systems may (i) obtain and send telemetry data reflecting their operation to threat management system 104, and (ii) obtain and use threat profiles from threat management system 104 to monitor the obtain telemetry data for indications of malicious activity.

To obtain the threat profiles, threat managements system 104 may perform any number and types of algorithms and/or analyses of the collected telemetry data to identify threats. When a threat is identified, fingerprints or other indicators in the telemetry data through which the threats were identified may be generalized and/or otherwise modified to obtain corresponding threat profiles. The threat profiles (and/or other information such as remediation actions to be performed when a threat corresponding to a threat profile is identified) may be distributed to data processing systems 200-210.

Turning to FIG. 2B, a second communication architecture in accordance with an embodiment is shown. In FIG. 2B, any of data processing systems 200-210 may be similar to data processing systems 100. However, in contrast to FIG. 2A, threat management system 104 may not be operably connected to data processing systems 200-210.

When data processing systems 200-210 are not operably connected to threat management system 104, data processing systems 200-210 may implement the second threat management model. To implement the second threat management model, data processing systems 200-210 may establish operable connections to at least one other of data processing systems 200-210. Data processing systems 200-210 may do so in accordance with any type of communication model (e.g., establish a mesh network or dynamically designed network).

While illustrated in FIG. 2B as interconnecting all of data processing systems 200-210, at least through one another, it will be appreciated that the established operable connections may fragment the data processing systems into groups connected to only some of data processing systems 200-210.

Once connected, the operably connected data processing systems may establish a corpus of data upon which an anomaly detection model may be established. The corpus of data may be obtained by aggregating telemetry data collected by the connected data processing systems.

The anomaly detection model may be obtained via any method. For example, a classifier or other type of trained model may be established based on the corpus of the training data. The anomaly detection model may be implemented using other types of models without departing from embodiments disclosed herein.

Once a data processing system obtain an anomaly detection model, the data processing system may begin to monitor its operation (using the anomaly detection model and threat profiles). If threats are detected, remediations may be performed.

If threats are detected through anomaly detection, then new threat profiles may be generated (e.g., based on the telemetry data identified as being anomalous to a sufficient degree). The anomaly detection model may provide anomalous ratings or classifications with respect to various portions of telemetry data. The portions of telemetry data flagged as indicative of a threat may be used as basis for new threat profiles. For example, the portions may be generalized and/or otherwise modified to obtain the new threat profiles.

The generalization process may include, for example, removing highly specific portions of the telemetry data to establish patterns to which new telemetry data may be compared. The generalization process may include other type of manipulations of the portions of the telemetry data.

Once obtained, the threat profiles may be distributed to the other data processing systems.

In an embodiment, any of threat management system 104 and/or data processing systems 200-210 are implemented using a hardware device including circuitry. The hardware device may be, for example, a digital signal processor, a field programmable gate array, or an application specific integrated circuit. The circuitry may be adapted to cause the hardware device to perform the functionality of threat management system 104 as discussed herein. Threat management system 104 may be implemented using other types of hardware devices without departing embodiment disclosed herein.

In an embodiment, any of threat management system 104 and/or data processing systems 200-210 are implemented using a processor adapted to execute computing code stored on a persistent storage that when executed by the processor performs the functionality of threat management system 104 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of threat management system 104 and/or data processing systems 200-210 include storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed herein. Any of these data structures may be implemented using, for example, lists, tables databases, linked lists, unstructured data, and/or other types of data structures.

Figure 3A:
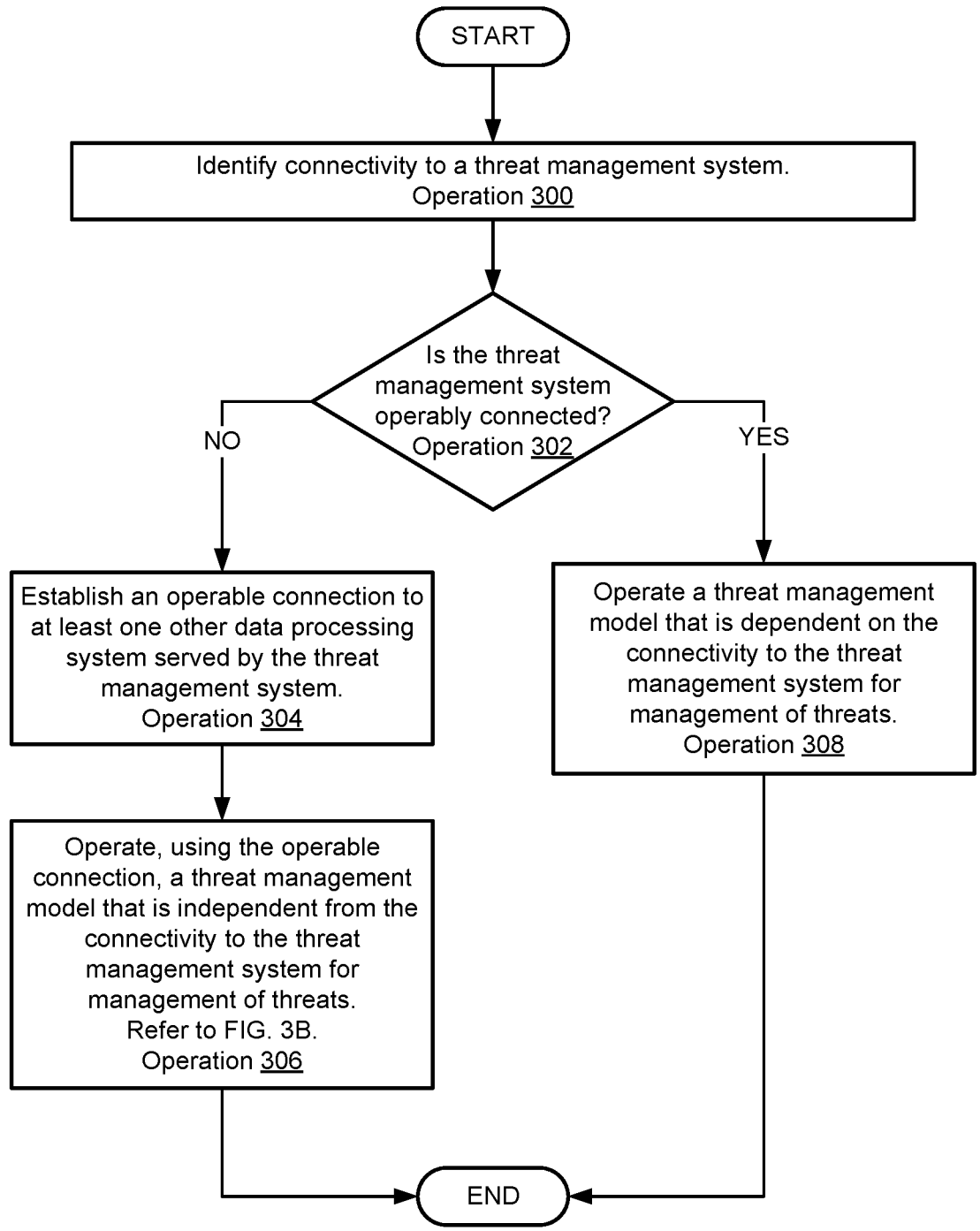
FIGS. 3A-3B show flow diagrams illustrating a method of managing threats to data processing systems in accordance with an embodiment.
Figure 3B:
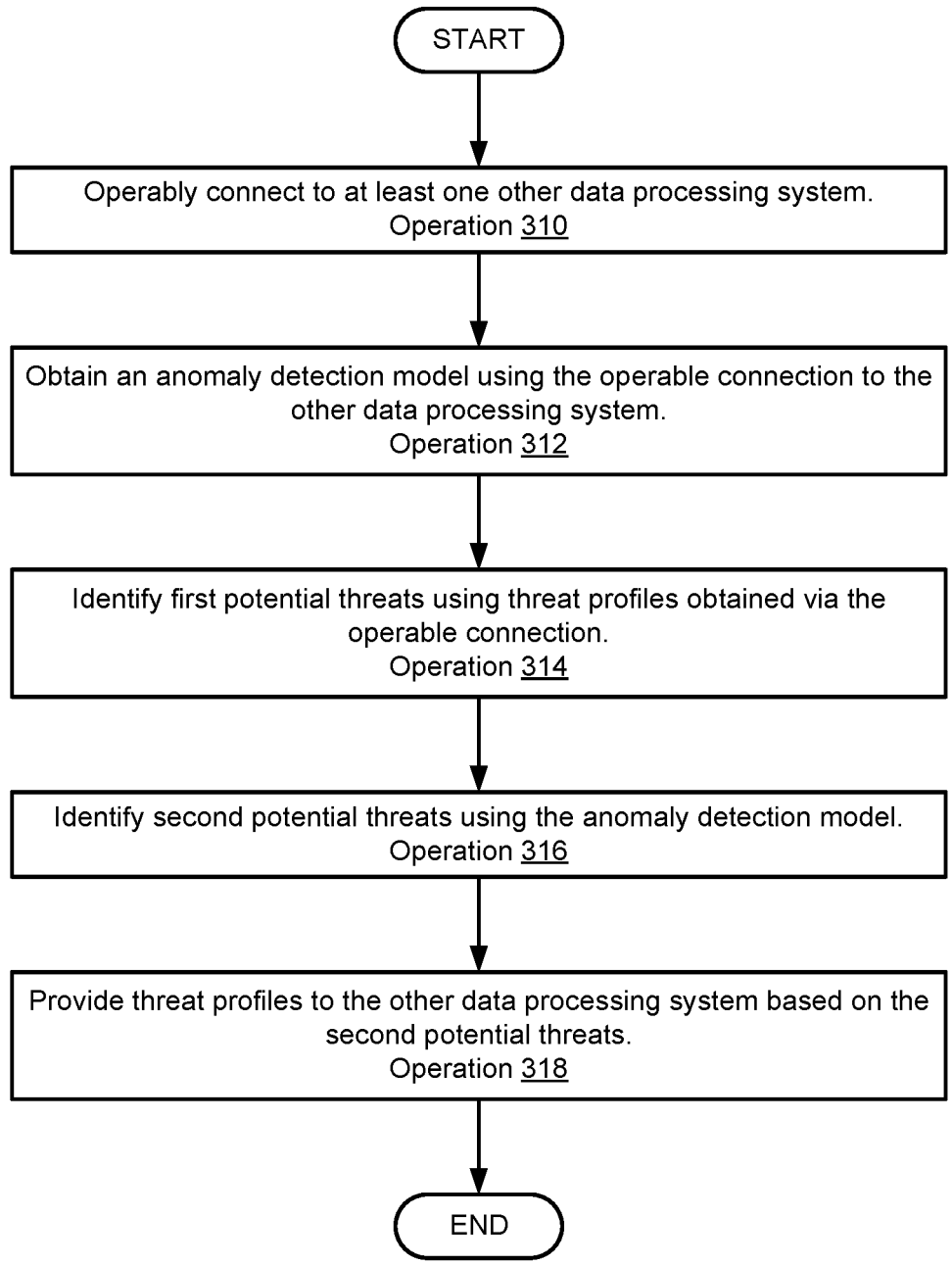

As discussed above, the components of FIG. 1 may perform various methods to manage threats to data processing systems. FIGS. 3A-3B illustrate methods that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method operating threat management models to remediate threats in accordance with an embodiment is shown. The method may be performed by any of data processing systems 100, threat management system 104, or other components of the system shown in FIG. 1.

At operation 300, connectivity between a data processing system and a threat management system is identified. The connectivity may be identified by, for example, (i) monitoring a communication channel (e.g., via a heartbeat signal) to identify whether it is open, (ii) performing a verification action such as attempting to send a communication from the data processing system to the threat management system, and/or (iii) via other methods. The data processing system may either be operably connected or not operably connected to the threat management system.

At operation 302, a determination is made regarding whether the threat management system is operably connected. The determination may be made based on the connectivity identified in operation 300.

If it is determined that the threat management system is not operably connected to the data processing system, then the method may proceed to operation 304. Otherwise the method may proceed to operation 308.

At operation 304, an operable connection to at least one other data processing system served by the threat management system is established. The operable connection may be established by verifying that communications may be sent between the data processing system and the at least one other data processing system, by establishing new communication channels, and/or via other methods.

In an embodiment, the data processing system maintains a map of the other data processing systems served by the threat management system. For example, the threat management system may provide information to the data processing system that allows the map to be established. The map may include information (e.g., network information) usable to reach the other data processing systems.

At operation 306, a threat management model is operated using the operable connection to the at least one other data processing system. The threat management model may be independent from connectivity to the threat management system with respect to managing threats to the data processing system.

The threat management model may be operated by (i) obtaining a corpus of telemetry data using the operable connection to the other data processing system, (ii) obtaining an anomaly detection model using the corpus of telemetry data, (iii) monitoring operation of the data processing system, (iv) using the anomaly detection model to classify operation of the data processing system with respect to anomalousness of the operation, (v) treating operations of the data processing system classified with a sufficient high level of anomalousness as indicating that the data processing system is subjected to a threat, (vi) remediating the threat, (vii) establishing new threat profiles based on the operations of the data processing classified with sufficiently high levels of anomalousness, and/or (viii) distributing the new threat profiles to the other data processing system. Additionally, as part of the threat management model, threat profiles previously obtained prior to no longer being connected to the threat management system and obtained from other data processing systems while not operably connected to the threat management system may be used to classify operations by the data processing system as being threats. Operations so classified may not be subject to anomaly detection since they are already classified as being threats. Refer to operation 308 for additional details regarding classifying operations of the data processing system using the threat profiles.

The threat management model may be operated via the method shown in FIG. 3B, or via other methods.

The method may end following operation 306.

Returning to operation 302, the method may proceed to operation 308 following operation 302 when it is determined that the threat management system is operably connected to the data processing system.

At operation 308, a threat management model that is dependent on connectivity to the threat management system for management of threats is operated. The threat management model may be operated by (i) providing telemetry data to the threat management system, (ii) obtaining threat profiles from the threat management system, (iii) identifying threats using the threat profiles, and (iv) remediating the identified threats.

The threats may be identified by matching patterns specified by the threat profiles to telemetry data obtained by the data processing system. A portion of telemetry data that matches a pattern defined by a threat profile may be treated as presence of a threat associated with the threat profile. The pattern may, for example, specify a series of log entries, actions by various applications, and/or other criteria regarding the operation of a data processing system.

The identified threats may be remediated by performing one or more remediation actions. The remediation actions may include any number and type of remediation actions. The remediations may be identified by performing a lookup based on an identify of a threat. For example, a data structure may associate different types of threats with remediations actions to be performed when that threat is identified.

The method may end following operation 308.

Using the method illustrated in FIG. 3A, a system in accordance with embodiments may continue to provide resilience to threats when threat management systems are unavailable. The system may do so by establishing one or more connections through which anomaly detection models may be established thereby allowing anomaly detection to be used to identify potential new threats to the system.

Turning to FIG. 3B, a flow diagram illustrating a method operating a threat management model that is independent from connectivity to a threat management system in accordance with an embodiment is shown. The method may be performed by any of data processing systems 100, threat management system 104, or other components of the system shown in FIG. 1. FIG. 3B may be an expansion of operation 306 shown in FIG. 3A.

At operation 310, at least one other data processing system is operably connected to a data processing system that is no longer operably connected to a threat management system. The operably connection may be established using network information for the other data processing system. Any number of data processing systems may be operably connected (directly, or indirectly through other data processing systems) to one another in this manner. The connected data processing systems may have been served by the threat management system.

At operation 312, an anomaly detection model is obtained using the operable connection to the other data processing systems. The anomaly detection model may be obtained by (i) obtaining access to a corpus of telemetry data from the operably connected data processing systems and (ii) using the telemetry data to obtain the anomaly detection model (e.g., through training or other generative processes). The anomaly detection model may be distributed amongst the data processing systems.

To obtain the anomaly detection model, the workloads of the connected data processing systems may be evaluated to select one of the data processing systems to generate the anomaly detection model.

At operation 314, a first potential threats are identified using threat profiles obtained via the operable connection. For example, once operably connected, the data processing systems may generate and distribute new threat profiles amongst themselves, and existing threat profiles from the threat management system may already be available. These threat profiles may be used to classify operation of a data processing system as either exhibiting or not exhibiting a threat. Operations classified as exhibiting a threat may be treated as the first potential threats.

The potential threats may then be subjected to remediation by performance of corresponding remediation actions.

At operation 316, second potential threats are identified using the anomaly detection model. The second potential threats may be identified by classifying operations of the data processing system (that are not classified as exhibiting threats using the threat profiles) using the anomaly detection model. The anomaly detection model may classify levels of anomalousness of the operations. The levels of anomalousness may be compared to a threshold or other criteria that, if met, indicate that the corresponding operations with respect to exhibiting or not exhibit threats. The operations classified as exhibiting threats may be treated as the second potential threats.

The second potential threats may then be subjected to remediation by performance of corresponding remediation actions.

At operation 318, threat profiles are provided to the other data processing systems based on the second threat profiles. The second threat profiles may be generated based on the operations classified as being the second potential threats, and distributed to the other data processing systems.

The method may end following operation 318.

Figure 4:
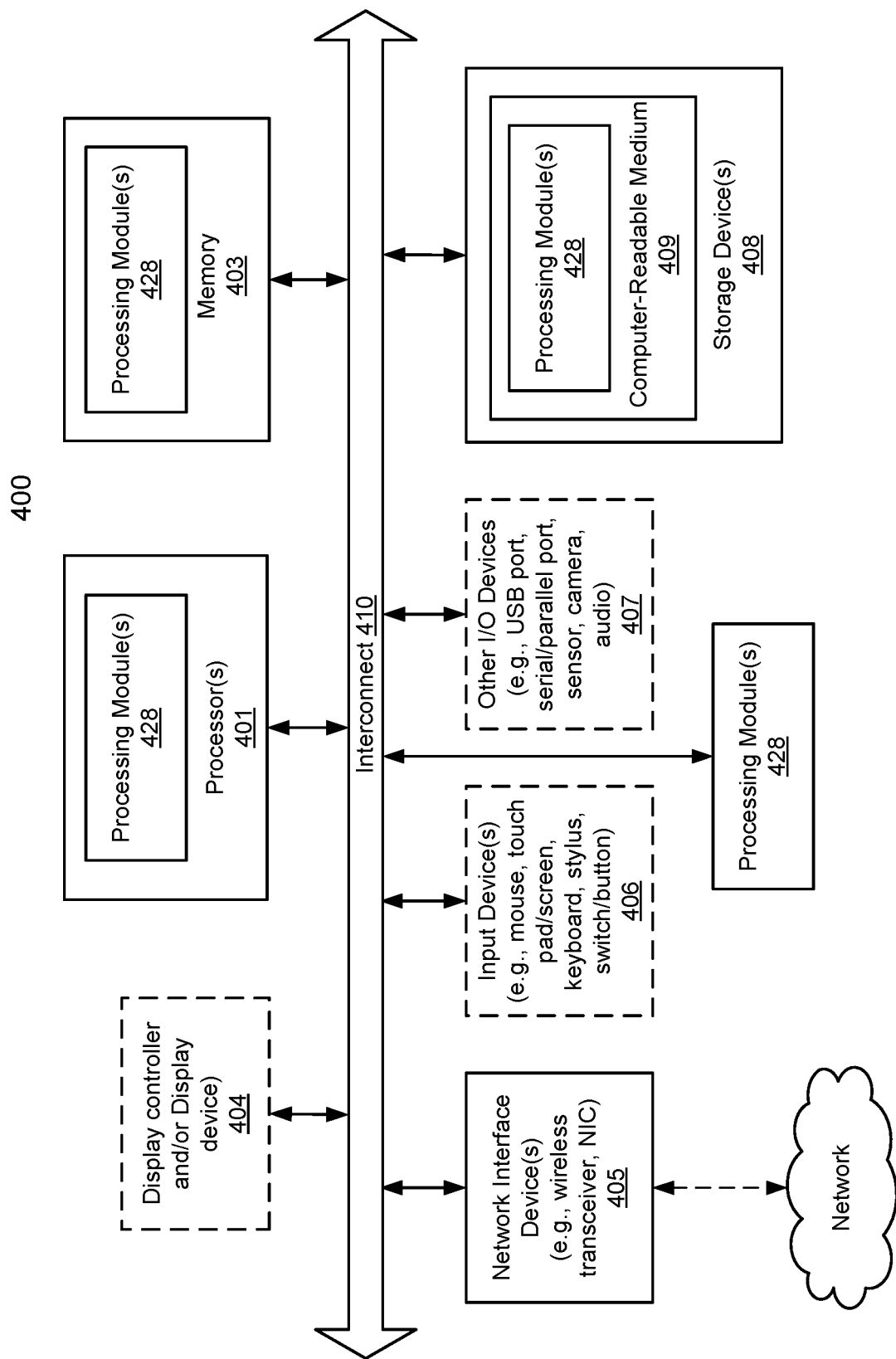
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing threats in a distributed environment, the method being performed by a first data processing system of the distributed environment and comprising:
    making, by a hardware processor of the first data processing system, a determination regarding whether the first data processing system is operably connected to a threat management system;
    in a first instance of the determination where the first data processing system is not operably connected to the threat management system:
        establishing, by the hardware processor, an operable connection to at least a second data processing system of the distributed environment; and
        operating, by the hardware processor, a first threat management model hosted by the first data processing system using the operable connection to the at least the second data processing system, the first threat management model being independent on connectivity to the threat management system for management of the threats.

2. The method of claim 1, wherein the method further comprises:
   in a second instance of the determination where the data processing system is operably connected to the threat management system:
      operating, by the hardware processor, a second threat management model hosted by the first data processing system, the second threat management model being dependent on connectivity to the threat management system for management of the threats.

3. The method of claim 2, wherein operating the first threat management model comprises, by the hardware processor:
   monitoring an operation of the first data processing system;
   performing an anomaly detection process based on the operation of the first data processing system, the anomaly detection process grading the operation with respect to the first data processing system and the at least the second data processing system for anomalousness; and
   in an instance of the performance of the anomaly detection process where the grade for the operation exceeds a threshold:
      treating the operation as a threat.

4. The method of claim 3, wherein operating the first threat management model further comprises, by the hardware processor:
   generating a threat update based on the operation; and
   distributing the threat update to the at least the second data processing system.

5. The method of claim 4, wherein performing the anomaly detection process based on the operation of the first data processing system comprises, by the processor:
   obtaining operation data from the at least the second data processing system;
   obtaining a corpus of operation data using the operation data and second operation data from the first data processing system;
   training an anomaly detection model using the corpus of the operation data; and
   using the anomaly detection model to grade the operation.

6. The method of claim 5, wherein the operation data comprises telemetry data for the second data processing system.

7. The method of claim 6, wherein operating the first threat management model further comprises, by the hardware processor:
   prior to performing the anomaly detection process, classifying the operation using a plurality of threat profiles obtained from a plurality of threat updates from the at least the second data processing system, each of the threat profiles comprising criteria against which the operation may be compared to identify whether the operation is one of the threats;
   in a first instance of the performance of the anomaly detection process where the classification for the operation indicates that the operation is one of the threats:
      initiating a remediation for the one of the threats without performing the anomaly detection process; and
   in a second instance of the performance of the anomaly detection process where the classification for the operation indicates that the operation is not one of the threats:
      performing the anomaly detection process.

8. A non-transitory machine-readable medium having instructions stored therein, which when executed by a processor, cause the processor to perform operations for managing threats in a distributed environment, the operations comprising:
   making a determination regarding whether a first data processing system of the distributed environment is operably connected to a threat management system;
   in a first instance of the determination where the first data processing system is not operably connected to the threat management system:
      establishing an operable connection to at least a second data processing system of the distributed environment; and
      operating a first threat management model hosted by the data processing system using the operable connection to the at least the second data processing system, the first threat management model being independent on connectivity to the threat management system for management of the threats.

9. The non-transitory machine-readable medium of claim 8, wherein the operation further comprise:
   in a second instance of the determination where the data processing system is operably connected to the threat management system:
      operating a second threat management model hosted by the data processing system, the second threat management model being dependent on connectivity to the threat management system for management of the threats.

10. The non-transitory machine-readable medium of claim 9, wherein operating the first threat management model comprises:
   monitoring an operation of the first data processing system;
   performing an anomaly detection process based on the operation of the first data processing system, the anomaly detection process grading the operation with respect to the first data processing system and the at least the second data processing system for anomalousness; and
   in an instance of the performance of the anomaly detection process where the grade for the operation exceeds a threshold:
      treating the operation as a threat.

11. The non-transitory machine-readable medium of claim 10, wherein operating the first threat management model further comprises:
   generating a threat update based on the operation; and
   distributing the threat update to the at least the second data processing system.

12. The non-transitory machine-readable medium of claim 11, wherein performing the anomaly detection process based on the operation of the first data processing system comprises:
   obtaining operation data from the at least the second data processing system;
   obtaining a corpus of operation data using the operation data and second operation data from the first data processing system;
   training an anomaly detection model using the corpus of the operation data; and
   using the anomaly detection model to grade the operation.

13. The non-transitory machine-readable medium of claim 12, wherein the operation data comprises telemetry data for the second data processing system.

14. The non-transitory machine-readable medium of claim 13, wherein operating the first threat management model further comprises:

prior to performing the anomaly detection process, classifying the operation using a plurality of threat profiles obtained from a plurality of threat updates from the at least the second data processing system, each of the threat profiles comprising criteria against which the operation may be compared to identify whether the operation is one of the threats;

in a first instance of the performance of the anomaly detection process where the classification for the operation indicates that the operation is one of the threats:
  initiating a remediation for the one of the threats without performing the anomaly detection process; and in a second instance of the performance of the anomaly detection process where the classification for the operation indicates that the operation is not one of the threats:
  performing the anomaly detection process.

15. A data processing system, comprising:
a processor; and
a memory coupled to the processor to store instructions, which when executed by the processor, cause the processor to perform operations for managing threats in a distributed environment, the operations comprising:
  making a determination regarding whether the data processing system is operably connected to a threat management system;
  in a first instance of the determination where the data processing system is not operably connected to the threat management system:
    establishing an operable connection to at least a second data processing system of the distributed environment; and
    operating a first threat management model using the operable connection to the at least the second data processing system, the first threat management model being independent on connectivity to the threat management system for management of the threats.

16. The data processing system of claim 15, wherein the operation further comprise:

in a second instance of the determination where the data processing system is operably connected to the threat management system:
  operating a second threat management model hosted by the data processing system, the second threat management model being dependent on connectivity to the threat management system for management of the threats.

17. The data processing system of claim 16, wherein operating the first threat management model comprises:
monitoring an operation of the data processing system;
performing an anomaly detection process based on the operation of the data processing system, the anomaly detection process grading the operation with respect to the data processing system and the at least the second data processing system for anomalousness; and
in an instance of the performance of the anomaly detection process where the grade for the operation exceeds a threshold:
  treating the operation as a threat.

18. The data processing system of claim 17, wherein operating the first threat management model further comprises:
generating a threat update based on the operation; and
distributing the threat update to the at least the second data processing system.

19. The data processing system of claim 18, wherein performing the anomaly detection process based on the operation of the data processing system comprises:
obtaining operation data from the at least the second data processing system;
obtaining a corpus of operation data using the operation data and second operation data from the data processing system;
training an anomaly detection model using the corpus of the operation data; and
using the anomaly detection model to grade the operation.

20. The data processing system of claim 19, wherein the operation data comprises telemetry data for the second data processing system.

* * * * *